US011667561B2

(12) United States Patent
Fu et al.

(10) Patent No.: US 11,667,561 B2
(45) Date of Patent: Jun. 6, 2023

(54) GLASS MATERIAL WITH A HIGH INDEX OF REFRACTION

(71) Applicant: Corning Incorporated, Corning, NY (US)

(72) Inventors: Qiang Fu, Painted Post, NY (US); Paulo Jorge Gaspar Marques, Fontainebleau (FR)

(73) Assignee: CORNING INCORPORATED, Corning, NY (US)

( * ) Notice: Subject to any disclaimer, the term of this patent is extended or adjusted under 35 U.S.C. 154(b) by 578 days.

(21) Appl. No.: 16/678,005

(22) Filed: Nov. 8, 2019

(65) Prior Publication Data

US 2020/0165156 A1 May 28, 2020

Related U.S. Application Data

(60) Provisional application No. 62/771,288, filed on Nov. 26, 2018.

(51) Int. Cl.
*C03C 3/097* (2006.01)
*G02B 27/01* (2006.01)
*F21V 8/00* (2006.01)

(52) U.S. Cl.
CPC .......... *C03C 3/097* (2013.01); *G02B 27/0172* (2013.01); *G02B 6/0011* (2013.01); *G02B 2027/0178* (2013.01)

(58) Field of Classification Search
CPC ......... C03C 3/068; C03C 3/062; C03C 3/097; C03C 4/08; C03C 3/095; C03C 3/064;
(Continued)

(56) References Cited

U.S. PATENT DOCUMENTS 3,503,764 A  3/1970 Young
3,877,953 A  4/1975 Broemer et al.
(Continued)

FOREIGN PATENT DOCUMENTS

CN  104129918 A  11/2014
CN  106830677 A  6/2017
(Continued)

OTHER PUBLICATIONS

International Search Report and Written Opinion of the European International Searching Authority; PCT;US2019;061416; dated Mar. 9, 2020; 11 pgs.
(Continued)

*Primary Examiner* — Hoan C Nguyen
(74) *Attorney, Agent, or Firm* — Robert L. Carlson; Svetlana Z. Short (57) ABSTRACT

A composition for a glass material comprising, on an oxide basis: one or more network formers chosen from the group of silicon dioxide ($SiO_2$) and phosphorous pentoxide ($P_2O_5$); one or more alkali metal oxides chose from the group consisting of lithium oxide (Li2O) and sodium oxide ($Na_2O$); 8 to 15 percent by weight zirconium oxide ($ZrO_2$); and one transition metal oxide consisting of 9 to 45 percent by weight niobium pentoxide ($Nb_2O_5$). In an embodiment, the composition consists of: 35 to 60 percent by weight silicon dioxide ($SiO_2$); 9.25 to 15.0 percent by weight lithium oxide ($Li_2O$); 0.5 to 2 percent by weight sodium oxide ($Na_2O$); 8 to 15 percent by weight zirconium oxide ($ZrO_2$); 0 to 3.5 percent by weight phosphorous pentoxide ($P_2O_5$); and 9 to 45 percent by weight niobium pentoxide ($Nb_2O_5$). In an embodiment, the glass material is a light guide for an augmented reality device.

10 Claims, 5 Drawing Sheets

(58) Field of Classification Search
CPC .......... C03C 3/078; C03C 3/19; C03C 3/066;
C03C 3/21; C03C 3/17; C03C 3/15;
C03C 3/14; C03C 14/006; C03C 3/145;
C03C 2214/16; C03C 21/002; C03C 4/02;
C03C 10/0027; C03C 10/0054; C03C
2204/00; C03C 10/0018; C03C 3/085;
C03C 10/0045; C03C 10/0036; C03C
3/087; G02B 27/0172; G02B 2027/0178;
G02B 6/0011; G02B 5/20; G02B 1/00;
G02B 3/00; F21V 9/30; B82Y 20/00;
F21S 41/176; F21S 41/16; F21S 41/141;
F21Y 2115/30; F21Y 2115/10; C09K
11/59; C09K 11/646; C09K 11/625; G02F
1/133617; H01L 33/501; C03B 32/02;
B32B 17/06
See application file for complete search history.

(56) References Cited

U.S. PATENT DOCUMENTS

| | | |
|---|---|---|
| 3,999,997 A | 12/1976 | Faulstich et al. |
| 4,057,435 A | 11/1977 | Boudot et al. |
| 4,213,786 A | 7/1980 | Faulstich et al. |
| 4,213,787 A | 7/1980 | Faulstich et al. |
| 4,400,473 A | 8/1983 | Mennemann et al. |
| 4,404,290 A | 9/1983 | Boudot |
| 4,732,876 A | 3/1988 | Nagamine et al. |
| 4,742,028 A | 5/1988 | Boudot et al. |
| 5,858,898 A | 1/1999 | Nakahara et al. |
| 7,897,531 B2 | 3/2011 | Ishioka |
| 9,650,285 B2 | 5/2017 | Negishi |
| 2002/0039958 A1* | 4/2002 | Goto .............. G02B 5/20 501/78 |
| 2004/0106507 A1* | 6/2004 | Kasuga ........... C03C 3/068 501/78 |
| 2007/0179038 A1* | 8/2007 | Uehara ........... C03C 3/068 501/78 |
| 2008/0254965 A1 | 10/2008 | Ishioka |
| 2012/0309606 A1* | 12/2012 | Taguchi ........... C03C 3/19 501/48 |
| 2013/0252797 A1* | 9/2013 | Rada ............... C03C 4/0028 501/32 |
| 2016/0075592 A1* | 3/2016 | Nagashima ...... C09K 11/646 252/301.6 F |
| 2016/0102010 A1* | 4/2016 | Beall .............. C03C 10/0027 501/4 |
| 2016/0355434 A1* | 12/2016 | Momono ........ C03C 10/0018 |
| 2017/0029322 A1 | 2/2017 | Galea et al. |
| 2017/0129801 A1 | 5/2017 | Kikkawa et al. |
| 2017/0283305 A1 | 10/2017 | Brocheton |
| 2018/0099901 A1* | 4/2018 | Beally ............. C03C 3/097 |
| 2018/0244559 A1* | 8/2018 | Akiba ............. C03C 3/068 |

FOREIGN PATENT DOCUMENTS

| | | | |
|---|---|---|---|
| CN | 106915901 A | 7/2017 | |
| CN | 108290768 A | 7/2018 | |
| EP | 0227269 A1 | 7/1987 | |
| GB | 2265367 A | 9/1993 | |
| JP | 2003020248 A * | 1/2003 | ............. C03B 11/02 |
| WO | 2001072650 A1 | 10/2001 | |
| WO | 2006075785 A2 | 7/2006 | |
| WO | 2017/172861 A1 | 10/2017 | |

OTHER PUBLICATIONS

Masuno et al; "Thermal and Optical Properties Of La2O3—Nb2O5 High Refrative Index Glasses," Opt Mater Exp, 2014, 4: 710-718.
Chinese Patent Application No. 201980076839.4, Office Action, dated Oct. 9, 2022, 5 pages of English Translation; Chinese Patent Office.

* cited by examiner

GLASS MATERIAL WITH A HIGH INDEX OF REFRACTION

This application claims the benefit of priority to U.S. Provisional Application Ser. No. 62/771,288 filed on Nov. 26, 2018, the content of which is relied upon and incorporated herein by reference in its entirety.

BACKGROUND

This disclosure generally pertains to a glass material having a relatively high index of refraction. More particularly, the disclosure pertains to a lens made from the glass material, and a virtual or augmented reality wearable device that incorporates the glass material.

Electromagnetic waves propagate through one medium differently than through another medium. For example, electromagnetic waves having a certain wavelength propagate through a vacuum at the speed of light but propagate through a different medium at a different speed (less than the speed of light). The ratio of the speed at which the electromagnetic waves propagate through a vacuum (i.e., the speed of light) and the speed at which the electromagnetic waves propagate through the medium at issue (referred to as the phase velocity) is called the index of refraction of the material. This all assumes that the medium is transparent or essentially transparent to the electromagnetic waves and thus allow the electromagnetic waves to propagate through the medium. Although the following discussion applies to electromagnetic waves of all wavelengths, only electromagnetic waves having wavelengths in the visible region of the electromagnetic spectrum will be discussed, and visible electromagnetic waves will hereinafter be referred to as "visible light."

A glass material is such a medium that can have an index of refraction that is different than the index of refraction of a surrounding medium. The glass material can utilize this difference in index of refraction to manipulate visible light. For example, using the difference in index of refraction, the glass material can be shaped into a lens to focus or disperse the visible light from one medium to another (such as from air, through the lens, and back to air). As another example, using the difference in index of refraction and the concept of internal reflection, the glass material can be utilized to guide the visible light from one place to another place.

Everything else being equal, the larger the index of refraction of the glass material from which the lens is made, the shorter the focal length and thus the higher optical power of the lens. This is an important attribute of a lens intended to manipulate visible light for sensing, such as a lens incorporated into a digital camera. In addition, the larger the index of refraction of the lens, the larger the numerical aperture of the lens and thus the smaller minimum length of an object that can be resolved by the lens (i.e., the larger the index of refraction of the lens, the "higher" the resolution of the lens). This is an important attribute of a lens incorporated into a microscope, which ideally is able to resolve as small of an object as possible. In addition, the angle of view of a camera is a function of the focal length of the lens that the camera uses. Specifically, the shorter the focal length of the lens, the wider the angle of view of the camera incorporating the lens. As mentioned above, the larger the index of refraction of the lens, the shorter the focal length of the lens. Therefore, the larger the index of refraction of the lens, the wider the angle of view of the camera.

In addition to acting as a lens, as mentioned, the glass material can be made to guide visible light across a space from one place to another relying upon the difference in index of refraction versus the surrounding medium. When visible light propagates through a first medium having a first index of refraction (such as the glass material) and contacts the boundary between the first medium and a second medium having a second lower index of refraction (such as air) at an incident angle that is normal to the boundary, part of the visible light leaves the first medium and propagates through the second medium. However, part of the visible light is reflected and propagates again through the first medium. As the incident angle changes from normal to the boundary toward parallel the boundary, an increasing amount of the visible light is reflected back to propagate through the first medium (the glass material) and a decreasing amount is transmitted through the boundary to propagate through the second medium (air). At some angle (the "critical angle"), all of the visible light is reflected to propagate through the first medium (glass material) and that is referred to as "total internal reflection." The critical angle, as well as the amount of the light that is reflected at angles between normal to the boundary and the critical angle, are functions of the difference in the indices of refraction between the two mediums. Therefore, everything else being equal, the higher the index of refraction of the glass material, the greater the amount of internal reflection through the glass material and the closer the critical angle is to the normal of the boundary between the glass material and the surrounding medium. This is an important attribute of a glass material utilized as a visible light guide in a wearable augmented reality or virtual reality device.

Such a glass material is made from a composition of chemical ingredients including one or more glass network formers such as silicon dioxide ($SiO_2$) and/or boron trioxide ($B_2O_3$), and perhaps one or more other chemical ingredients selected to impart certain properties to resulting glass material. Typically, the chemical ingredients are in a solid powder form, and the powders are heated until they liquefy and mix together in a liquid state. The liquid material is then press-molded into the desired shape or cast as a bar and allowed to cool and solidify into the glass material, which is sometimes referred to as optical glass. The glass material is then reheated and press-molded into the desired shape, such as a lens. The lens might thereafter be ground and polished if the press-molding was not sufficiently precise. When the liquid material is cooled into the glass material or when the glass material is reheated, there is a risk of devitrification (i.e., the precipitation of crystals). The crystallization decreases the transparency of the glass material to visible light. The greater the ability of the glass material to resist devitrification, the more "thermal stability" the glass material is said to have.

The index of refraction of a glass material of pure silicon dioxide ($SiO_2$) is 1.5 (and therefore, suboptimal for many applications). Those aforementioned one or more other chemical ingredients selected to impart certain properties to the resulting glass material might include one or chemical ingredients selected to increase the index of refraction of the resulting glass material. However, such chemical ingredients can decrease the "thermal stability" of the glass material, that is, increase the level of devitrification that occurs during cooling and reheating of the glass material.

In some applications for the glass material, such as the augmented/virtual reality device or a digital camera, it is beneficial for the application to weigh as less as possible so as not to fatigue the user. Therefore, the glass material should likewise weigh as less as possible and, thus, have as low of density as possible. However, chemical ingredients added to increase the index of refraction of the glass material can additionally increase density of the glass material and thus weight of the lens.

Moreover, as alluded to above, the glass material should be as transparent to visible light as possible. That is, the glass material should absorb as little of the visible light as possible. However, chemical ingredients added to increase the index of refraction of the glass material can additionally decrease the transmissivity of the lens.

Further, when the chemical ingredients of the composition are heated to become liquid, or the glass material is reheated to a liquid, the temperature required to do so is preferably below a temperature that causes the chemical ingredients or a byproduct to volatize and corrode the vessel (such as a crucible). Likewise, if the temperature is high enough, elements or compounds that form the vessel can leech into the liquid and thereby cause discoloration of the glass material. Chemical ingredients added to increase the index of refraction of the glass material can additionally raise the temperature required to liquefy the glass material or the initial chemical ingredients.

Finally, if the liquid material has a viscosity within a certain range, a lens or other finished glass material product can be formed directly from the liquid material without the need for grinding and polishing after the liquid is cooled into the glass material—a process sometimes referred to as precision press molding or direct molding. As with the above properties, chemical ingredients added to increase the index of refraction of the glass material can additionally alter the viscosity of the glass material out of the range acceptable for direct molding.

Therefore, there is a need for chemical composition, from which a glass material used to form a lens is made, that provides a sufficiently high index of refraction for the lens without causing an impermissible level of devitrification, without impermissibly increasing the density of the glass material, without impermissibly decreasing the transmissivity of the lens, without impermissibly increasing the temperature required to maintain the glass material in a liquid phase, and without deviating the viscosity of the glass material so that that the glass material cannot be direct molded into the lens.

Such chemical ingredients that can be added to increase the index of refraction of the glass material include: (i) alkaline earth metal oxides, such as magnesium oxide (MgO), calcium oxide (CaO), strontium oxide (SrO), and barium oxide (BaO); (ii) transition metal oxides, such as niobium pentoxide ($Nb_2O_5$), titanium dioxide ($TiO_2$), yttrium oxide ($Y_2O_3$), tantalum pentoxide ($Ta_2O_5$); and (iii) rare earth metal oxides, such as lanthanum oxide ($La_2O_3$), erbium oxide ($Er_2O_3$), holmium oxide ($Ho_2O_3$), cerium oxide ($CeO_2$), and praseodymium oxide ($Pr_2O_3$). Niobium pentoxide ($Nb_2O_5$) and titanium dioxide ($TiO_2$) in particular are known to increase the index of refraction and improve thermal stability, without hindering transparency, of the glass material.

However, adding a large content of niobium pentoxide ($Nb_2O_5$) to increase the index of refraction of the glass material without rendering the network structure, density, viscosity, and thermal stability of the glass material inadequate has been challenging. In European Publication No. EP0227269, filed on Nov. 4, 1986, entitled "Optical and ophthalmic glasses," a composition including 5-26% by weight of niobium pentoxide ($Nb_2O_5$) to make a glass material was disclosed. However, as alluded to above, thermal stability was an issue and it was taught that the addition of network former boron trioxide ($B_2O_3$) was necessary to reduce devitrification. In addition, it was taught that the combination of the network forming silicon dioxide ($SiO_2$) and boron trioxide ($B_2O_3$) should not exceed 36% by weight, because weight percentage in excess of that amount would decrease the index of refraction of the glass material and considerably increase devitrification. Further, it was taught that the compositions should include 15-28 percent by weight calcium oxide (CaO) to increase the index of refraction. Finally, it was taught that the weight percentage of niobium pentoxide ($Nb_2O_5$) in the composition cannot exceed 26%, because weight percentages beyond that would cause significant devitrification, i.e., the glass material would not have thermal stability. Finally, the reported densities of all of the example glass materials were 3.56 g/cm$^3$ or higher.

In U.S. Pat. No. 3,503,764, filed on Jan. 20, 1967, entitled "CORE GLASS FOR FIBER-OPTIC STRUCTURES HAVING HIGH INDEX OF REFRACTION," a composition for a glass material is disclosed that includes 5-20% by weight niobium pentoxide ($Nb_2O_5$) (with specific example compositions ranging from 7-16% by weight). However, as with EP0227269, boron trioxide ($B_2O_3$) is included as a network former with silicon dioxide ($SiO_2$) in every one of the example compositions provided. In addition, the combined weight percentage of the network forming silicon dioxide ($SiO_2$) and boron trioxide ($B_2O_3$) is taught to be a maximum of 30% by weight and the maximum example compositions provided included 24% by weight. Finally, the melting temperature is disclosed to be between 2450° F. (1343° C.) and 2600° F. (1426° C.), which is potentially corrosive to melting containers.

In U.S. Pat. No. 3,877,953, filed on Nov. 27, 1972, entitled "NIOBIUM PENTOXIDE-CONTAINING BOROSILICATE GLASSES," a composition for a glass material is disclosed that includes 2-53 percent by weight niobium pentoxide ($Nb_2O_5$). However, as with the preceding, it is taught that the composition must include boron trioxide ($B_2O_3$) as a network former along with silicon dioxide ($SiO_2$), in an amount between 8% and 14% by weight. The example compositions provide between 30.6% and 41.0% by weight combined silicon dioxide ($SiO_2$) and boron trioxide ($B_2O_3$). In addition, potassium oxide ($K_2O$) is taught to be included in the composition and is present in every example provided.

In U.S. Pat. No. 3,999,997, filed on Jul. 22, 1975, entitled "OPTICAL GLASS," a composition for a glass material including 4-20 percent by weight niobium pentoxide ($Nb_2O_5$) is disclosed. However, as with the preceding, it is taught that the composition includes boron trioxide ($B_2O_3$) as a network former along with silicon dioxide ($SiO_2$), in an amount between 15% and 36% by weight. The examples disclose compositions that include boron trioxide ($B_2O_3$) in an amount 25.8% by weight and 35.8% by weight. Further, the composition is to include 6% to 12% by weight fluorine (F).

In U.S. Pat. No. 4,057,435, filed on Oct. 8, 1976, entitled "OPTICAL GLASSES," a composition for a glass material including 0-5 percent by weight niobium pentoxide ($Nb_2O_5$) is disclosed, to raise the durability of the glass material. However, as with the preceding patents, the disclosed composition includes boron trioxide ($B_2O_3$) as a network former along with silicon dioxide ($SiO_2$), in an amount of at least 30% by weight. The example compositions that include niobium pentoxide ($Nb_2O_5$) include only 1.94% by weight and 1.96% by weight niobium pentoxide ($Nb_2O_5$). Those example compositions also include 36.70% and 36.34% by weight boron trioxide ($B_2O_3$), and over 10% by weight silicon dioxide ($SiO_2$).

In U.S. Pat. No. 4,400,473, filed on Jun. 2, 1982, entitled "ACIDPROOF, HYDROLYSIS-RESISTANT OPTICAL AND OPHATHALMIC [sic] GLASS OF LOW DENSITY," a composition for a glass material including 6-11 percent by weight niobium pentoxide ($Nb_2O_5$) is disclosed. However, as with the preceding patents, the disclosed composition includes boron trioxide ($B_2O_3$) as a network former along with silicon dioxide ($SiO_2$), in an amount of 6% to 12% by weight.

In U.S. Pat. No. 4,404,290, filed on Dec. 1, 1982, entitled "GLASSES OF HIGH REFRACTIVE INDEX, LOW DISPERSION, AND LOW DENSITY," a composition for a glass material including 3%-11% by weight niobium pentoxide ($Nb_2O_5$) is disclosed. However, as with the preceding patents, the disclosed composition includes boron trioxide ($B_2O_3$) as a network former along with silicon dioxide ($SiO_2$), in an amount of 20.5% to 25% by weight. The patent states that such an amount is necessary to prevent devitrification. Further, at least 3.5% by weight titanium dioxide ($TiO_2$) is taught to be added to further raise the index of refraction of the resulting glass material. Moreover, the patent teaches that niobium pentoxide ($Nb_2O_5$) cannot exceed 11% by weight, because an amount in excess of that weight percentage would increase the density and dispersion too much. Calcium oxide (CaO) is also taught as a necessary component of the glass.

In U.K. Publication No. GB 2265367 A, filed on Mar. 1, 1993, entitled "Highly refractive ophthalmic and optical glass," a composition for a glass material that includes 10%-25% by weight niobium pentoxide ($Nb_2O_5$) is disclosed. The example compositions are limited to 14.21% to 16.30% by weight niobium pentoxide ($Nb_2O_5$). However, cesium oxide ($Cs_2O$) is taught to be an essential component of the compositions to reduce the melting point of the glass material. In addition, like others summarized above, calcium oxide (CaO) is taught to be an essential component of the composition. Moreover, lanthanum oxide ($La_2O_3$) is taught to be a necessary component. Finally, all of the example compositions include boron trioxide ($B_2O_3$) as a network former along with silicon dioxide ($SiO_2$).

In U.S. Pat. No. 4,213,786, filed on Jun. 5, 1979, entitled "LIGHTWEIGHT, HIGH REFRACTIVE INDEX GLASSES FOR SPECTACLE LENSES," a composition for a glass material including 18%-24% by weight niobium pentoxide ($Nb_2O_5$) is disclosed. All the example compositions include boron trioxide ($B_2O_3$) as a network former along with silicon dioxide ($SiO_2$). The composition further includes 10%-15% by weight titanium dioxide ($TiO_2$) and 7%-10% by weight barium oxide (BaO). The barium oxide (BaO) is said to be particularly important to prevent devitrification.

In U.S. Pat. No. 4,732,876, filed on May 28, 1987, entitled "OPHTHALMIC AND OPTICAL GLASS," a composition for a glass material including 1%-30% by weight niobium pentoxide ($Nb_2O_5$) is disclosed. However, as with others above, the composition includes 21.5% to 26% by weight boron trioxide ($B_2O_3$) as a network former along with silicon dioxide ($SiO_2$). The boron trioxide ($B_2O_3$) is said to be important to prevent devitrification.

In U.S. Pat. No. 7,897,531, filed on Jul. 16, 2007, entitled "GLASS," a composition for a glass material including 0.5-15 mole percentage niobium pentoxide ($Nb_2O_5$) is disclosed. However, titanium dioxide ($TiO_2$) is taught as a necessary component to obtain a glass material with a high index of refraction and a low specific gravity. In addition, alkali earth metal oxides are taught as a necessary component of the composition to decrease dispersion and increase the index of refraction.

SUMMARY

The inventors have surprisingly discovered, contrary to the above, that niobium pentoxide ($Nb_2O_5$) can be added to a composition to increase the index of refraction of the resulting glass material without rendering the network structure, density, viscosity, and thermal stability of the glass material inadequate. Further, the inventors have surprisingly discovered that niobium pentoxide ($Nb_2O_5$) can be added to do so: (a) without the need to incorporate boron trioxide ($B_2O_3$) into the composition; (b) with network forming silicon dioxide ($SiO_2$) in excess of 36% by weight; (c) without the need to incorporate alkaline earth metal oxides such as calcium oxide (CaO) or barium oxide (BaO) into the composition; (d) while incorporating niobium pentoxide ($Nb_2O_5$) in excess of 26% by weight; (e) without the need to incorporate potassium oxide ($K_2O$) into the composition; (f) without the need to incorporate fluorine (F) into the composition; (g) without the need to incorporate titanium dioxide ($TiO_2$) into the composition; (h) without the need to incorporate cesium oxide ($Cs_2O$) into the composition; (i) without the need to incorporate lanthanum oxide ($La_2O_3$) into the composition; and (j) without the need to incorporate lanthanum oxide ($La_2O_3$) into the composition.

In a first aspect of the present disclosure, a composition for a glass material comprises, on an oxide basis: one or more network formers chosen from the group consisting of silicon dioxide ($SiO_2$) and phosphorous pentoxide ($P_2O_5$); one or more alkali metal oxides chosen from the group consisting of lithium oxide ($Li_2O$) and sodium oxide ($Na_2O$); 8 to 15 percent by weight zirconium oxide ($ZrO_2$); and one transition metal oxide consisting of 9 to 45 percent by weight niobium pentoxide ($Nb_2O_5$). In an embodiment, both silicon dioxide ($SiO_2$) and phosphorous pentoxide ($P_2O_5$) are chosen from the one or more network formers chosen from the group consisting of silicon dioxide ($SiO_2$) and phosphorous pentoxide ($P_2O_5$). In an embodiment, the composition comprises 35 to 60 percent by weight silicon dioxide ($SiO_2$) and 0.1 to 3.5 percent by weight phosphorous pentoxide ($P_2O_5$). In an embodiment, the composition comprises 39 to 59 percent by weight silicon dioxide ($SiO_2$) and 1.9 to 3.0 percent by weight phosphorous pentoxide ($P_2O_5$). In an embodiment, only silicon dioxide ($SiO_2$) is chosen from the one or more network formers chosen from the group consisting of silicon dioxide ($SiO_2$) and phosphorous pentoxide ($P_2O_5$). In an embodiment, silicon dioxide ($SiO_2$) is 37 to 41 percent by weight of the composition. In an embodiment, both lithium oxide ($Li_2O$) and sodium oxide ($Na_2O$) are chosen from the one or more alkali metal oxides chosen from the group consisting of lithium oxide ($Li_2O$) and sodium oxide ($Na_2O$). In an embodiment, the combined lithium oxide ($Li_2O$) and sodium oxide ($Na_2O$) is 10 to 16 percent by weight of the composition. In an embodiment, lithium oxide ($Li_2O$) is 9 to 15 percent by weight of the composition and sodium oxide ($Na_2O$) is 0.5 to 1.5 percent by weight of the composition. In an embodiment, the composition consists of 35 to 60 percent by weight silicon dioxide ($SiO_2$), 9.25 to 15.0 percent by weight lithium oxide ($Li_2O$), 0.5 to 2 percent by weight sodium oxide ($Na_2O$), 8 to 15 percent by weight zirconium oxide ($ZrO_2$), 0 to 3.5 percent by weight phosphorous pentoxide ($P_2O_5$), and 9 to 45 percent by weight niobium pentoxide ($Nb_2O_5$). In an embodiment, the composition consists of 37 to 43 percent by weight silicon dioxide ($SiO_2$), 9.25 to 10.25 percent by weight lithium oxide ($Li_2O$), 0.75 to 1 percent by weight sodium oxide ($Na_2O$), 8.5 to 10 percent by weight zirconium oxide ($ZrO_2$), and 36 to 45 percent by weight niobium pentoxide ($Nb_2O_5$).

In a second aspect of the present disclosure, a glass material comprises on an oxide basis: one or more network formers chosen from the group consisting of silicon dioxide ($SiO_2$) and phosphorous pentoxide ($P_2O_5$); one or more alkali metal oxides chosen from the group consisting of lithium oxide ($Li_2O$) and sodium oxide ($Na_2O$); 8 to 15 percent by weight zirconium oxide ($ZrO_2$); and one transition metal oxide consisting of 9 to 45 percent by weight niobium pentoxide ($Nb_2O_5$); wherein, the index of refraction of the glass material at 633 nm is between 1.6070 and 1.7660; wherein, the density of the glass material is between 2.70 $g/cm^3$ and 3.29 $g/cm^3$; and liquidus temperature of the glass material is less than 1200° C. In an embodiment, both silicon dioxide ($SiO_2$) and phosphorous pentoxide ($P_2O_5$) are chosen from the one or more network formers chosen from the group consisting of silicon dioxide ($SiO_2$) and phosphorous pentoxide ($P_2O_5$). In an embodiment, the glass material comprises 35 to 60 percent by weight silicon dioxide ($SiO_2$), and 0.1 to 3.5 percent by weight phosphorous pentoxide ($P_2O_5$). In an embodiment, the glass material comprises 39 to 59 percent by weight silicon dioxide ($SiO_2$), and 1.9 to 3.0 percent by weight phosphorous pentoxide ($P_2O_5$). In an embodiment, only silicon dioxide ($SiO_2$) is chosen from the one or more network formers chosen from the group consisting of silicon dioxide ($SiO_2$) and phosphorous pentoxide ($P_2O_5$). In an embodiment, silicon dioxide ($SiO_2$) is 37 to 41 percent by weight of the glass material. In an embodiment, both lithium oxide ($Li_2O$) and sodium oxide ($Na_2O$) are chosen from the one or more alkali metal oxides chosen from the group consisting of lithium oxide ($Li_2O$) and sodium oxide ($Na_2O$). In an embodiment, the combined lithium oxide ($Li_2O$) and sodium oxide ($Na_2O$) is 10 to 16 percent by weight of the glass material. In an embodiment, lithium oxide ($Li_2O$) is 9 to 15 percent by weight of the glass material, and sodium oxide ($Na_2O$) is 0.5 to 1.5 percent by weight of the glass material. In an embodiment, the glass material consists of 35 to 60 percent by weight silicon dioxide ($SiO_2$), 9.25 to 15.0 percent by weight lithium oxide ($Li_2O$), 0.5 to 2 percent by weight sodium oxide ($Na_2O$), 8 to 15 percent by weight zirconium oxide ($ZrO_2$), 0 to 3.5 percent by weight phosphorous pentoxide ($P_2O_5$), and 9 to 45 percent by weight niobium pentoxide ($Nb_2O_5$). In an embodiment, the glass material consists of 37 to 43 percent by weight silicon dioxide ($SiO_2$), 9.25 to 10.25 percent by weight lithium oxide ($Li_2O$), 0.75 to 1 percent by weight sodium oxide ($Na_2O$), 8.5 to 10 percent by weight zirconium oxide ($ZrO_2$), and 36 to 45 percent by weight niobium pentoxide ($Nb_2O_5$). In an embodiment, the dynamic viscosity of the glass material as a liquidus is between 14.9 and 25.1 poise.

In a third aspect of the present disclosure, a head mounted wearable device comprises an image forming device that generates visible light to a light guiding device, which includes a glass material through which the visible light propagates, wherein the glass material comprises on an oxide basis: one or more network formers chosen from the group consisting of silicon dioxide ($SiO_2$) and phosphorous pentoxide ($P_2O_5$); one or more alkali metal oxides chosen from the group consisting of lithium oxide ($Li_2O$) and sodium oxide ($Na_2O$); 8 to 15 percent by weight zirconium oxide ($ZrO_2$); and one transition metal oxide consisting of 9 to 45 percent by weight niobium pentoxide ($Nb_2O_5$); wherein, the index of refraction of the glass material at 633 nm is between 1.6070 and 1.7660; wherein, the density of the glass material is between 2.70 $g/cm^3$ and 3.29 $g/cm^3$; and liquidus temperature of the glass material is less than 1200° C. In an embodiment, both silicon dioxide ($SiO_2$) and phosphorous pentoxide ($P_2O_5$) are chosen from the one or more network formers chosen from the group consisting of silicon dioxide ($SiO_2$) and phosphorous pentoxide ($P_2O_5$). In an embodiment, the glass material comprises 35 to 60 percent by weight silicon dioxide ($SiO_2$), and 0.1 to 3.5 percent by weight phosphorous pentoxide ($P_2O_5$). In an embodiment, the glass material comprises 39 to 59 percent by weight silicon dioxide ($SiO_2$), and 1.9 to 3.0 percent by weight phosphorous pentoxide ($P_2O_5$). In an embodiment, only silicon dioxide ($SiO_2$) is chosen from the one or more network formers chosen from the group consisting of silicon dioxide ($SiO_2$) and phosphorous pentoxide ($P_2O_5$). In an embodiment, silicon dioxide ($SiO_2$) is 37 to 41 percent by weight of the glass material. In an embodiment, both lithium oxide ($Li_2O$) and sodium oxide ($Na_2O$) are chosen from the one or more alkali metal oxides chosen from the group consisting of lithium oxide ($Li_2O$) and sodium oxide ($Na_2O$). In an embodiment, the combined lithium oxide ($Li_2O$) and sodium oxide ($Na_2O$) is 10 to 16 percent by weight of the glass material. In an embodiment, lithium oxide ($Li_2O$) is 9 to 15 percent by weight of the glass material, and sodium oxide ($Na_2O$) is 0.5 to 1.5 percent by weight of the glass material. In an embodiment, the glass material consists of 35 to 60 percent by weight silicon dioxide ($SiO_2$), 9.25 to 15.0 percent by weight lithium oxide ($Li_2O$), 0.5 to 2 percent by weight sodium oxide ($Na_2O$), 8 to 15 percent by weight zirconium oxide ($ZrO_2$), 0 to 3.5 percent by weight phosphorous pentoxide ($P_2O_5$), and 9 to 45 percent by weight niobium pentoxide ($Nb_2O_5$). In an embodiment, the glass material consists of 37 to 43 percent by weight silicon dioxide ($SiO_2$), 9.25 to 10.25 percent by weight lithium oxide ($Li_2O$), 0.75 to 1 percent by weight sodium oxide ($Na_2O$), 8.5 to 10 percent by weight zirconium oxide ($ZrO_2$), and 36 to 45 percent by weight niobium pentoxide ($Nb_2O_5$). In an embodiment, the dynamic viscosity of the glass material as a liquidus is between 14.9 and 25.1 poise.

DETAILED DESCRIPTION

In the tables below, the formulas of the components of the composition are the oxide mole percent and oxide weight percent, as is recognized in the art of glass science. The weight percentages of the oxides are calculated from the mole percentages and provided for convenience. Any difference from a total of 100 mole or weight percent is due to rounding. In all the example compositions, silicon dioxide ($SiO_2$) is the primary network former of the glass material, and in all the examples, there is of sufficient mole percentage to form a stable glass network.

In Table 1, there are three glass material compositions presented. All three glass material compositions incorporate zirconium dioxide ($ZrO_2$) in varying amounts, the amount of zirconium dioxide increasing by example number. Alkali metal oxides, here lithium oxide ($Li_2O$) and sodium oxide ($Na_2O$) are added to increase melt ability of the glass material and decrease the viscosity. Like silicon dioxide ($SiO_2$), phosphorous pentoxide ($P_2O_5$) is a network former but with a higher index of refraction.

TABLE 1

| Component (mol %/wt %) | Example 1 | | Example 2 | | Example 3 | |
|---|---|---|---|---|---|---|
| $SiO_2$ | 60.3 | 64.2 | 59.3 | 61.8 | 58.3 | 59.6 |
| $Li_2O$ | 30.2 | 16.0 | 29.7 | 15.4 | 29.2 | 14.9 |
| $Na_2O$ | 1.3 | 1.4 | 1.3 | 1.4 | 1.3 | 1.4 |
| $ZrO_2$ | 6.9 | 15 | 8.5 | 18 | 10.0 | 21.0 |
| $P_2O_5$ | 1.3 | 3.3 | 1.3 | 3.2 | 1.3 | 3.1 |
| n (at 633 nm) | 1.5776 | | 1.588 | | 1.5974 | |
| ρ (g/cm³) | 2.58 | | | | | |

The index of refraction (n) of visible light at a wavelength of 633 nm of the glass material made from all three of the compositions was determined. Zirconium dioxide ($ZrO_2$) is added to reduce devitrification, to decrease the liquidus temperature of the glass material, and also to increase the index of refraction. Surprisingly, moderately high indices of refraction can be achieved by increasing the amount of zirconium dioxide ($ZrO_2$) in the composition while maintaining the density of the glass composition at a low level (i.e., below 3.3 g/cm³). The examples illustrate that the index of refraction of the glass material is a function of the mole percentage (or weight percentage) of the zirconium dioxide ($ZrO_2$)—the more zirconium dioxide ($ZrO_2$) included in the composition, the higher the index of refraction of the resulting glass material. Although the density of only the first composition (Example 1) was specifically measured, it can safely be assumed from the indices of refraction that the densities of the glass material made from compositions of Examples 2 and 3 were in the same range and below 3.3 g/cm³. Therefore, to obtain a glass material (and lens made therefrom) with a moderately high index of refraction (between 1.5776 and 1.5974) but a low density (under 3.3 g/cm³), the following mole percentages can be utilized: (a) silicon dioxide ($SiO_2$) between 58.3 and 60.3 mole percent; (b) lithium oxide ($Li_2O$) between 29.2 and mole 30.2 percent; and (c) zirconium dioxide ($ZrO_2$) between 6.9 and 10 mole percent. The composition can further include sodium oxide ($NaO_2$) and phosphorus pentoxide ($P_2O_5$), such as between 1 and 3 percent each.

In Table 2 below, there are eight additional example compositions for the glass material presented. All eight compositions continue to incorporate zirconium dioxide ($ZrO_2$) in varying amounts, but the amount of zirconium dioxide decreases by example number. Again, the alkali metal oxides lithium oxide ($Li_2O$) and sodium oxide ($Na_2O$) are added, as well as network former phosphorous pentoxide ($P_2O_5$). In these example compositions of Table 2, ever increasing amounts of niobium pentoxide ($Nb_2O_5$) were added. However, the inventors have discovered that niobium pentoxide ($Nb_2O_5$) can surprisingly be utilized to greatly increase the index of refraction of the glass material (>1.7600) while allowing the glass material to have a low density (<3.30), without the inclusion of alkaline earth metal oxides such as calcium oxide (CaO) and without the inclusion of titanium dioxide ($TiO_2$). In other words, the mole percentage of niobium pentoxide ($Nb_2O_5$) can be manipulated to produce glass materials with an index of refraction between 1.6073 and 1.7655 while still having a density below 3.3 g/cm³. The last composition listed in Table 2 is a comparative example. The comparative example is a commercially available glass material, which, while incorporating niobium pentoxide ($Nb_2O_5$) in the composition, has a suboptimal density of 3.65 g/cm³. The index of refraction of the comparative example (1.800) is only slightly higher than the index of refraction of Example 11 (1.7655) while having a much higher density (3.65 versus 3.25). In all eight of the example compositions, there is a complete lack of boron trioxide ($B_2O_3$), potassium oxide ($K_2O$), alkaline earth metal oxides such as calcium oxide (CaO) or barium oxide (BaO), and fluorine (F).

Figure 1:
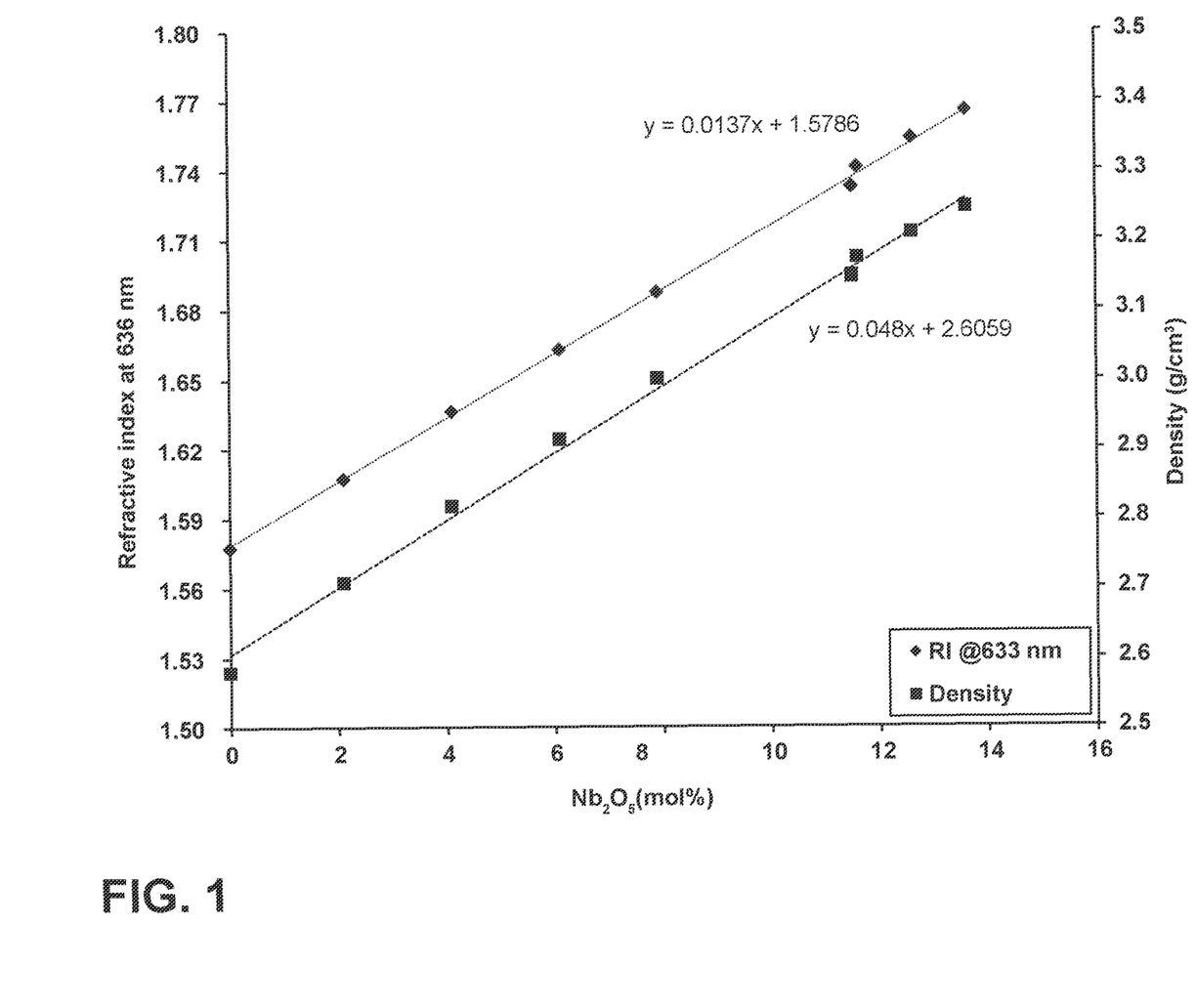
FIG. 1 is graph illustrating both the index of refraction of the novel glass material disclosed herein as a function of mole percentage niobium pentoxide ($Nb_2O_5$) in the composition (top line) and (b) the density of the resulting glass material as a function of mole percentage niobium pentoxide ($Nb_2O_5$) in the composition (bottom line)

Referring now to FIG. 1, both (a) the index of refraction of the resulting glass material as a function of mole percentage niobium pentoxide ($Nb_2O_5$) in the composition (top line) and (b) the density of the resulting glass material as a function of mole percentage niobium pentoxide ($Nb_2O_5$) in the composition (bottom line) are plotted. The relationships are linear in both cases. The data points on the extreme left are from the composition of Example 1 from Table 1 above. The remainder of the data points are from the compositions of Examples 4-11 below.

Figure 2:
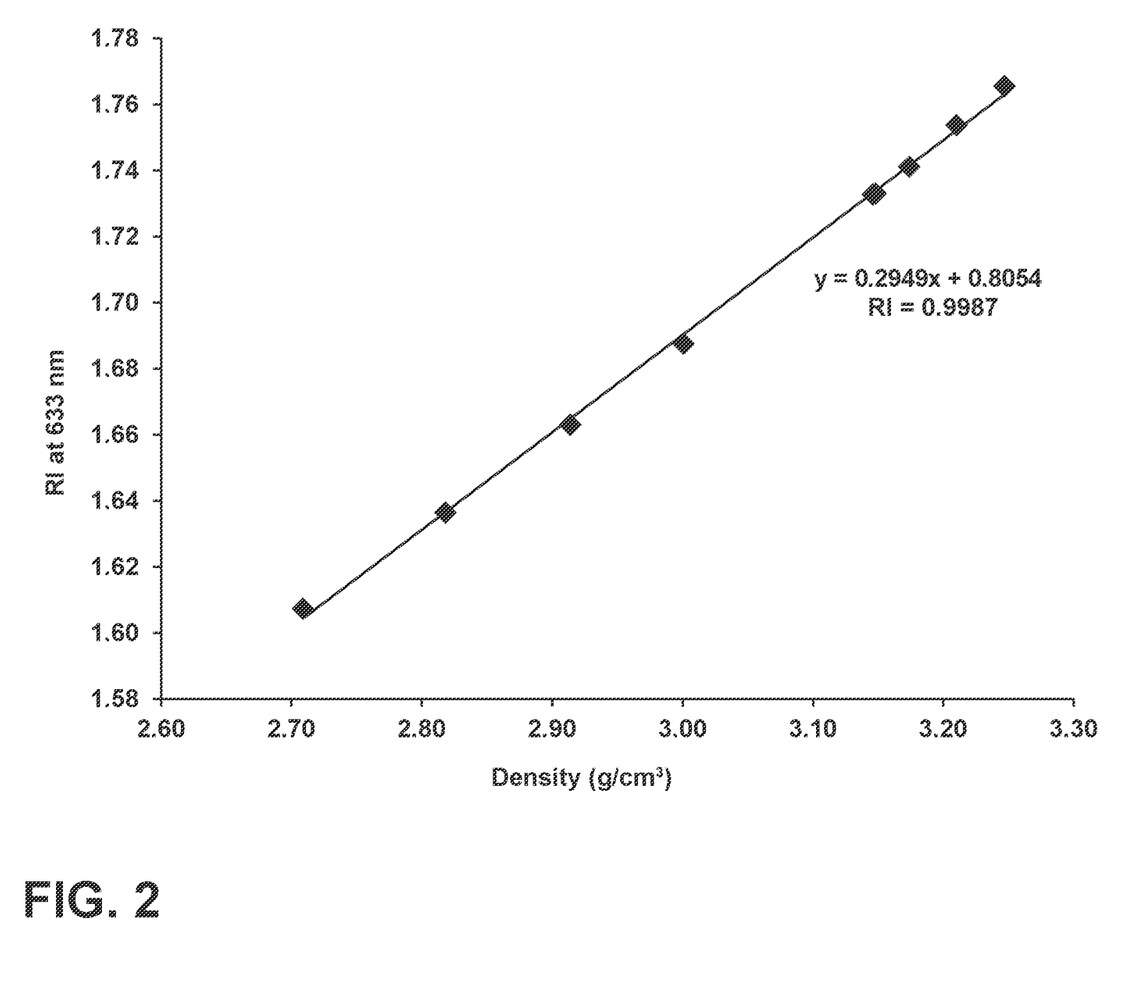
FIG. 2 is a graph of the index of refraction of the glass material as a function of the density of the glass material, for the compositions of Examples 4-11 below.

Referring now to FIG. 2, the index of refraction of the glass material is plotted as a function of the density of the glass material, for the compositions of Examples 4-11 below. As the figure reveals, the relationship is linear.

TABLE 2

| Component (mol %/wt %) | Example 4 | | Example 5 | | Example 6 | | Example 7 | | Example 8 | |
|---|---|---|---|---|---|---|---|---|---|---|
| $SiO_2$ | 59.1 | 58.2 | 57.9 | 53.7 | 56.7 | 49.2 | 55.6 | 45.8 | 53.4 | 39.9 |
| $Li_2O$ | 29.5 | 14.4 | 28.9 | 13.1 | 28.3 | 12.2 | 27.8 | 11.4 | 26.7 | 9.92 |
| $Na_2O$ | 1.3 | 1.3 | 1.2 | 1.1 | 1.2 | 1.1 | 1.2 | 1.1 | 1.1 | 0.85 |

TABLE 2-continued

| | | | | | | | | | | |
|---|---|---|---|---|---|---|---|---|---|---|
| $ZrO_2$ | 6.9 | 13 | 6.6 | 13 | 6.5 | 12 | 6.3 | 11 | 6.1 | 9.3 |
| $P_2O_5$ | 1.3 | 3.0 | 1.2 | 2.6 | 1.2 | 2.5 | 1.2 | 2.3 | 1.1 | 1.9 |
| $Nb_2O_5$ | 2.1 | 9.1 | 4.1 | 17 | 6.1 | 23 | 7.9 | 29 | 11.5 | 38.0 |
| n (at 633 nm) | 1.6073 | | 1.6364 | | 1.6629 | | 1.6874 | | 1.7327 | |
| ρ (g/cm³) | 2.71 | | 2.82 | | 2.91 | | 3.00 | | 3.15 | |
| $T_{liquidus}$ (° C.) | | | | | | | | | 1170 | |

| | Example | | | | | | | |
|---|---|---|---|---|---|---|---|---|
| Component (mol %/wt %) | 9 | | 10 | | 11 | | Comparative | |
| $SiO_2$ | 54.1 | 40.7 | 53.4 | 39.2 | 52.8 | 37.8 | 40.1 | 28.5 |
| $Li_2O$ | 27.0 | 10.1 | 26.7 | 9.76 | 26.4 | 9.41 | 11.3 | 4.00 |
| $Na_2O$ | 1.2 | 0.93 | 1.1 | 0.83 | 1.1 | 0.81 | 0 | 0 |
| $ZrO_2$ | 6.2 | 9.6 | 6.1 | 9.2 | 6.0 | 8.8 | 3.8 | 5.5 |
| $P_2O_5$ | | | | | | | | |
| $Nb_2O_5$ | 11.6 | 38.6 | 12.6 | 40.1 | 13.6 | 43.1 | 4.8 | 15 |
| $B_2O_3$ | | | | | | | 2.4 | 2.0 |
| CaO | | | | | | | 22.9 | 15.2 |
| $La_2O_3$ | | | | | | | 5.4 | 21 |
| $TiO_2$ | | | | | | | 9.3 | 8.8 |
| n (at 633 nm) | 1.7411 | | 1.7537 | | 1.7655 | | 1.800 | |
| ρ (g/cm³) | 3.17 | | 3.21 | | 3.25 | | 3.65 | |
| $T_{liquidus}$ (° C.) | 1155 | | 1180 | | 1175 | | 1095 | |
| $\eta_{liquidus}$ (poise) | 25 | | 20 | | 15 | | 15 | |

The compositions of Table 2 also surprisingly exhibit liquidus temperatures sufficiently low to allow for production of the glass material in a common commercial crucible without an undue risk of corrosion. As Table 2 reveals, the liquidus temperature of Examples 8-11 are between 1155° C. and 1180° C., well below the 1300° C. to 1400° C. range where the common commercial crucible becomes less tenable. The liquidus temperature is the temperature at which crystals first appear while decreasing the temperature of the glass material from a liquid state, or the temperature at which the last crystals melt as the temperature of the glass material is increased from a lower temperature. Similarly, as Table 2 again reveals, the liquidus viscosity of the glass materials made from the compositions of Examples 9-11 are acceptable (15-25 poise) and similar to the comparative example (15 poise).

Figure 3:
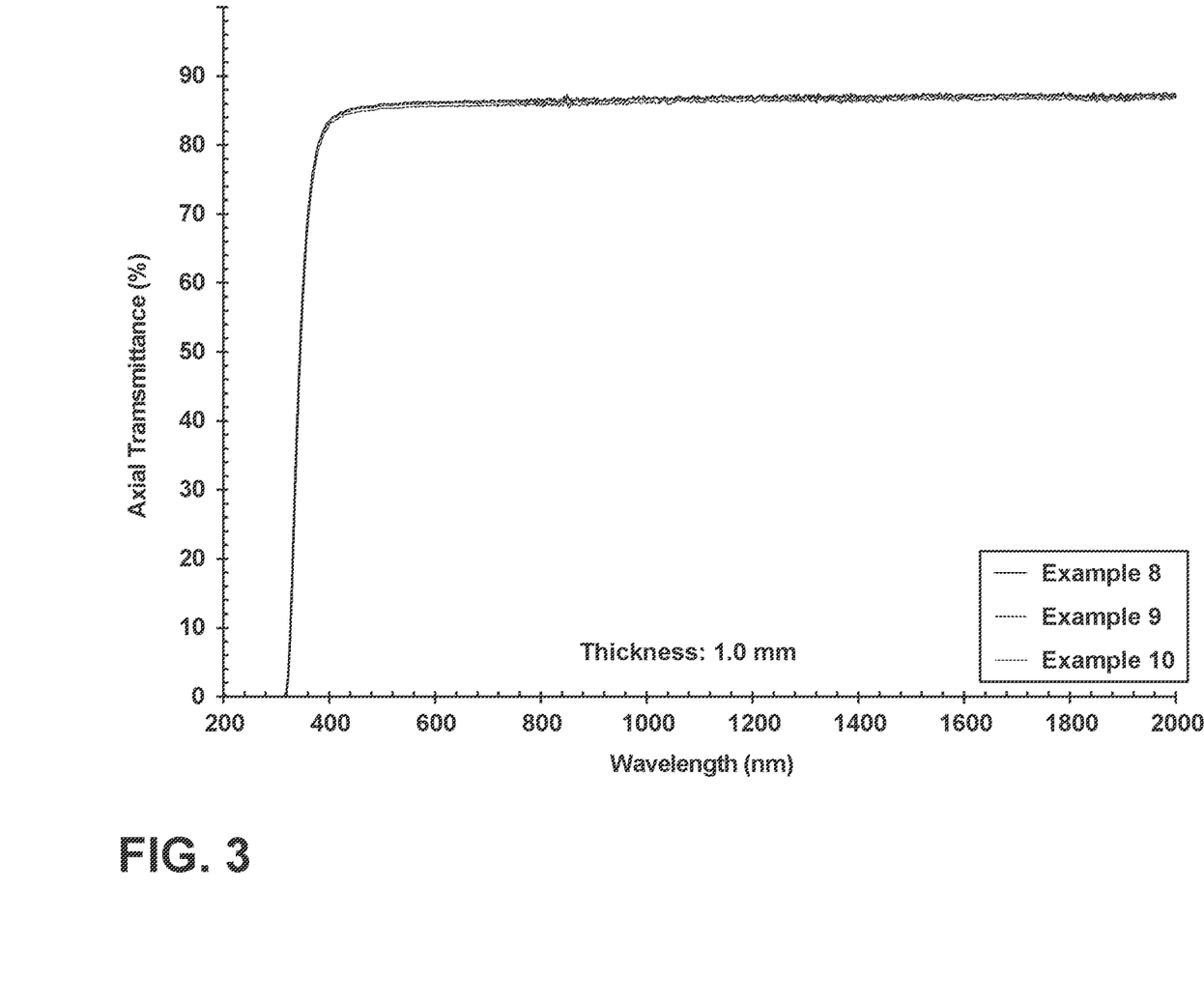
FIG. 3 is a graph illustrating the axial transmittance of electromagnetic waves of various wavelengths (from 200 nm to 2000 nm) through 1.0 mm thick samples of the glass material made from each of the compositions set forth in Examples 8-10 below.

The above compositions also surprisingly exhibit adequate transmissivity. Referring now to FIG. 3, glass material from each of the compositions described above as Examples 8-10 were tested for transparency. More specifically, the axial transmittance of electromagnetic waves of various wavelengths (from 200 nm to 2000 nm) through 1.0 mm thick glass material made from each of the aforementioned compositions were tested. As the graph illustrated in the figure reveals, each of the glass materials made from the compositions of Examples 8-10 were adequately transparent (85% or greater) to visible light (400-700 nm) as well as longer wavelengths in the infrared region (greater than 700 nm).

Figure 4:
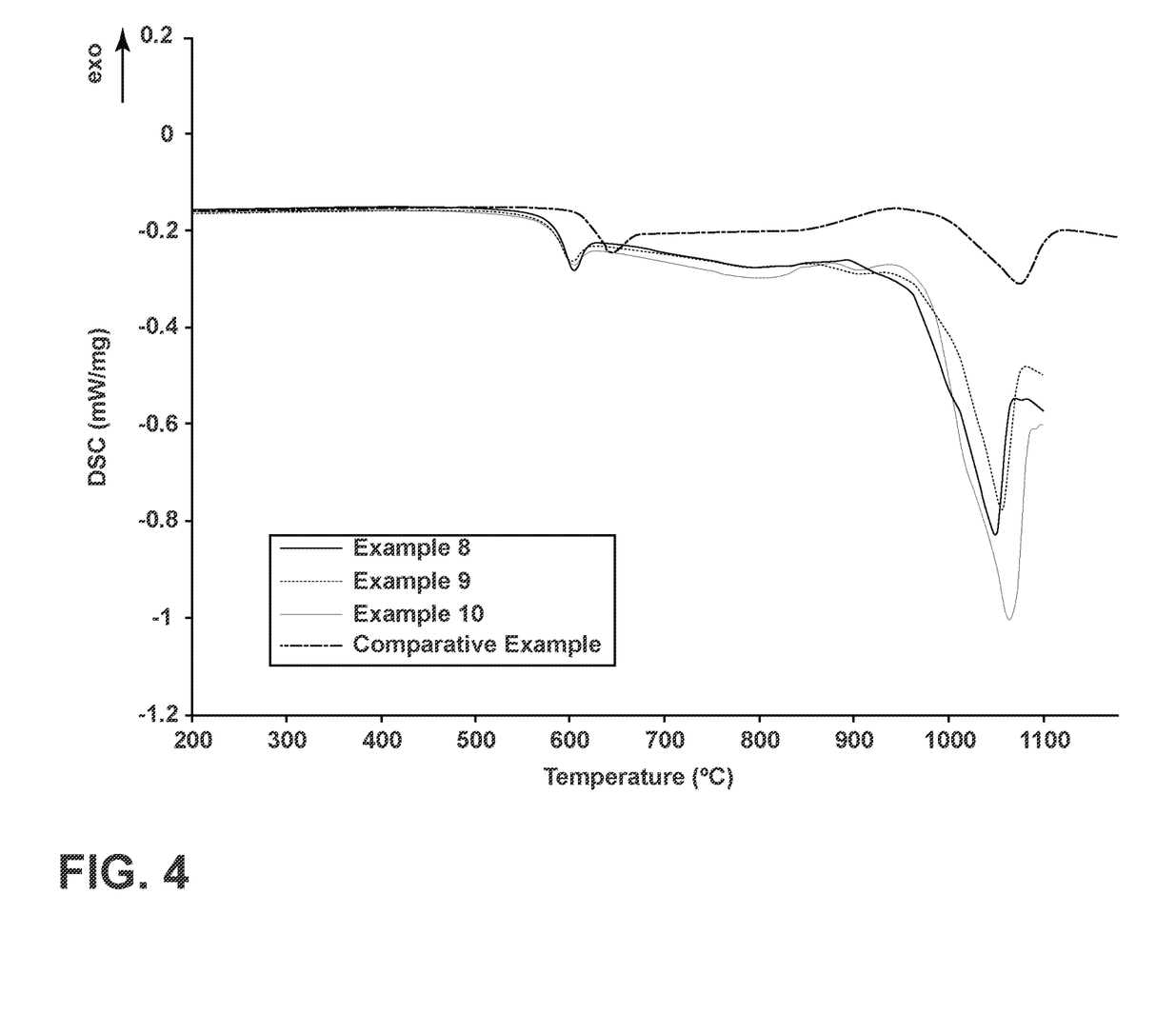
FIG. 4 is a differential scanning calorimetry (DSC) analysis of the glass materials made from the compositions of Examples 8-10 and a Comparative Example below, revealing the glass transition temperature ($T_g$), the crystallization peak temperature ($T_x$), and the melting temperature ($T_m$) of various glass materials.

The above compositions also surprisingly exhibit good thermal stability, without incorporating boron trioxide ($B_2O_3$) as a network former. Referring now to FIG. 4, a differential scanning calorimetry (DSC) analysis of the glass materials made from the compositions of Examples 8-10 is illustrated. In addition, the figure illustrates a DSC analysis of the glass material made from the composition of the Comparative Example. In a DSC analysis, pulverized glass material is subjected to progressively increasing temperature. The pulverized glass material either absorbs heat or generates heat at any specific temperature. The heat generated or absorbed is measured. The data is plotted, revealing a DSC curve, with the heat absorbed or generated plotted as a function of temperature. Changes in the slope of the DSC curve reveal the glass transition temperature ($T_g$), the crystallization temperature ($T_x$), and the melting temperature ($T_m$) of the glass material being analyzed. Each of those temperatures can be further subdivided into an onset, a peak/midpoint, and an offset temperature. For example, the change in slope identifying the glass transition temperature ($T_g$) can be a range including a temperature where the change in slope begins (onset), a temperature where the change in slope ends (offset), and a temperature in between (midpoint). The areas of the curve identifying the crystallization temperature ($T_x$) and the melting temperature ($T_m$) tend to have peaks instead of midpoints, due to the slope of the curve changing from positive to negative, or vice-versa, thus forming an apex.

The first change in slope on the DSC curve can be the glass transition temperature (Tg), which is the temperature range where the glass material transitions between hard and rubbery. The next change in slope in the direction of increasing temperature is the crystallization temperature ($T_x$), which is the temperature range at which crystals precipitate from the glass material. The next change in slope in the direction of increasing temperature is the melting temperature ($T_m$), which is the temperature range at which the glass liquefies.

The magnitude of the difference Δ between the $T_g$ and the $T_x$ (that is, $\Delta=T_x-T_g$) of the glass material is an indication of the thermal stability, i.e., the resistance to devitrification during reheating of the glass material. The larger the difference Δ, the greater the thermal stability of the glass material. This is because to mold the glass material, the glass material must be reheated to at least the glass transition temperature Tg. However, if the temperature of the glass material reaches the crystallization peak temperature (Tx), then devitrification will occur. Therefore, a larger Δ provides a wider temperature range within which to mold the glass material into the lens without causing devitrification. A Δ of 100° C. can be considered a minimum for the glass material to have thermal stability, with the Δ being more preferably at least 150° C. or more. As the graph of FIG. 4 reveals, all of the glass materials (made from the compositions of Examples 8-10) have sufficiently high Δ (approaching 200° C.) to be considered to have thermal stability, and have only a slightly less Δ than the Comparative Example. In addition, another indication of thermal stability is that the glass material has a $T_x$ of above 500° C., and more preferably above 550° C. All of the glass materials (made from the compositions of Examples 8-10) have a $T_x$ above 500° C. and either above or close to 550° C.

Further, another indication of thermal stability is the area between the baseline of the DSC curve and the apex of the curve denoting the crystallization temperature ($T_x$). The area between the apex and the baseline is the enthalpy of crystallization. Therefore, the greater the enthalpy of crystallization, the faster the crystallization occurs at that temperature range of crystallization. In other words, the greater the enthalpy of crystallization, the vigorous and energetic devitrification will be as the temperature of the glass material is within that temperature range. As the DSC curve at FIG. 4 reveals, the glass materials made from the compositions of Examples 8-10 have an almost non-existent area between the apex and the baseline and therefore a small enthalpy of crystallization, and much smaller than the enthalpy of crystallization for the Comparative Example. Therefore, the glass materials made from the compositions of Examples 8-10 are very thermally stable and more thermally stable than the Comparative Example. This is a surprising result, considering the lack of boron trioxide ($B_2O_3$) as a network former and the large weight/mass percentages of niobium pentoxide ($Nb_2O_5$) included in those compositions.

Similarly, a glass transition temperature $T_x$ below 650° C. makes the glass material suitable to make a lens from the glass material via direct molding (precision press molding). The glass materials (made from the compositions of Examples 8-10) all have a glass transition temperature $T_x$ below 650° C.

Figure 5:
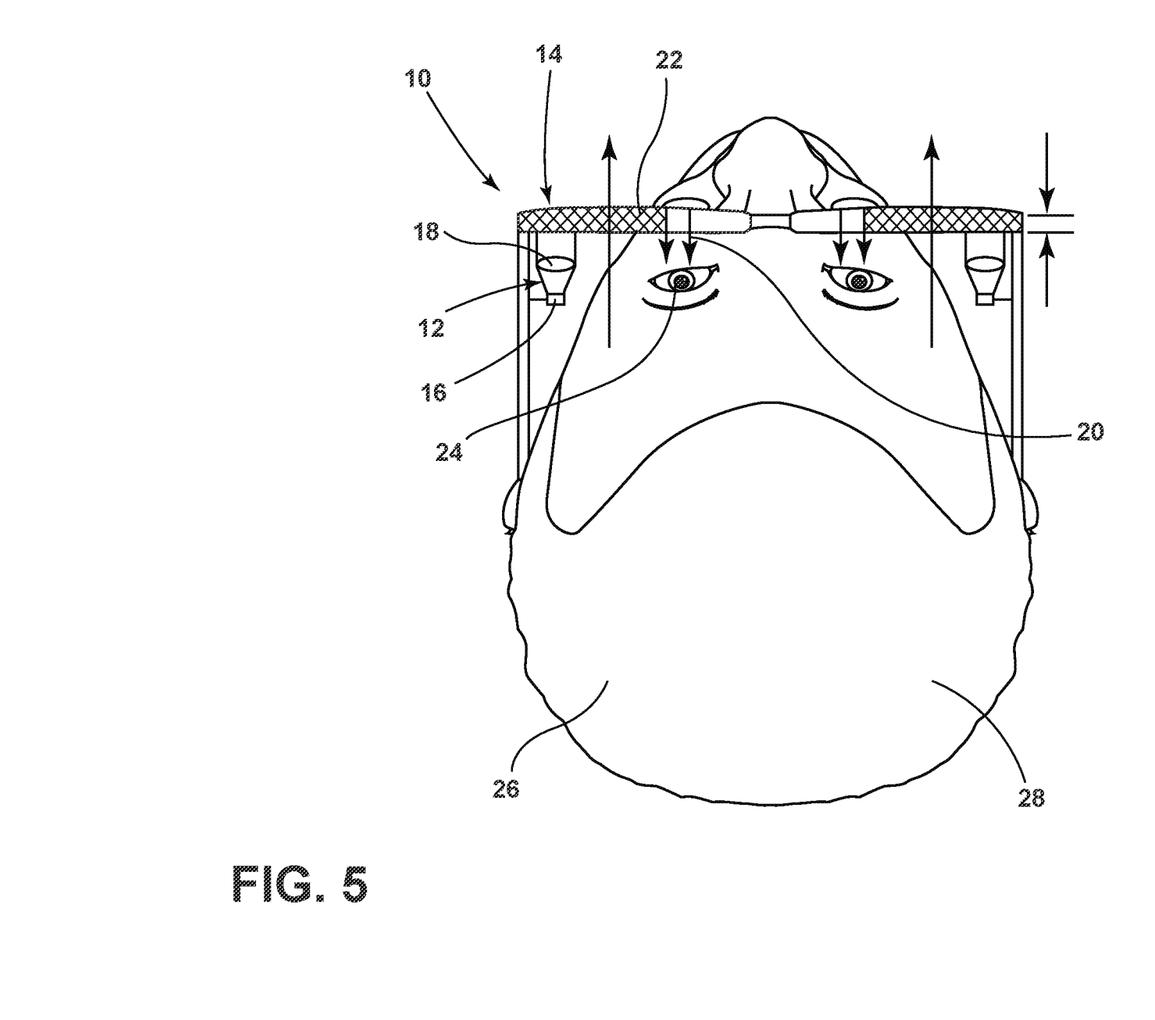
FIG. 5 is an overhead view of a head mounted wearable device including an image forming device and a light guiding device, illustrating the light guiding device incorporating the novel glass material of the present disclosure.

Referring now to FIG. 5, a head mounted wearable device 10 includes an image forming device 12 and a light guiding device 14. The image forming device 12 includes a light source 16 and can include a lens 18 that manipulates visible light 20 that the light source 16 projects before the visible light 20 propagates into the light guiding device 14. The light guiding device 14 includes an embodiment of a novel glass material 22 disclosed above. (The lens 18 can also be made of the novel glass material 22.) Reflecting repeatedly within the glass material 22 (e.g., for a distance of 20 mm to 300 mm), the visible light 20 propagates through the glass material 22 and exits the glass material 22 such that it is incident to an eye 24 of a user 26 that is wearing the head mounted wearable device 10. Thus, the glass material 22 acts as a light guide transmitting visible light 20 from the light source 16 to the eye 24 of the user 26. Consequently, the user 26 can sense the visible light 20 (such as a virtual image) and the external world image in a superimposed manner. The user 26 wears the head mounted wearable device 10 on a head 28 of the user 26.

It will be apparent to those skilled in the art that various modifications and variations can be made without departing from the spirit or scope of the claims.

What is claimed is:

1. A composition for a glass material comprising, on an oxide basis:
   35 to 60 percent by weight silicon dioxide ($SiO_2$);
   9.25 to 15.0 percent by weight lithium oxide ($Li_2O$);
   0.5 to 2 percent by weight sodium oxide ($Na_2O$);
   8 to 15 percent by weight zirconium oxide ($ZrO_2$);
   0 to 3.5 percent by weight phosphorous pentoxide ($P_2O_5$); and
   9 to 45 percent by weight niobium pentoxide ($Nb_2O_5$).

2. The composition of claim 1, wherein, the composition comprises 35 to 60 percent by weight silicon dioxide ($SiO_2$), and 0.1 to 3.5 percent by weight phosphorous pentoxide ($P_2O_5$).

3. The composition of claim 1, wherein, the composition comprises 39 to 59 percent by weight silicon dioxide ($SiO_2$), and 1.9 to 3.0 percent by weight phosphorous pentoxide ($P_2O_5$).

4. The composition of claim 1 comprising:
   9 to 15 percent by weight lithium oxide (Li2O); and
   0.5 to 2 percent by weight sodium oxide ($Na_2O$).

5. The composition of claim 1, wherein, the composition consists of:
   37 to 43 percent by weight silicon dioxide ($SiO_2$);
   9.25 to 10.25 percent by weight lithium oxide ($Li_2O$);
   0.75 to 1 percent by weight sodium oxide ($Na_2O$);
   8.5 to 10 percent by weight zirconium oxide ($ZrO_2$); and
   36 to 45 percent by weight niobium pentoxide ($Nb_2O_5$).

6. A glass material comprising, on an oxide basis:
   37 to 43 percent by weight silicon dioxide ($SiO_2$);
   0 to 3.5 percent by weight phosphorous pentoxide ($P_2O_5$);
   9.25 to 10.25 percent by weight lithium oxide ($Li_2O$);
   0.75 to 1 percent by weight sodium oxide ($Na_2O$);
   8.5 to 10 percent by weight zirconium oxide ($ZrO_2$); and
   36 to 45 percent by weight niobium pentoxide ($Nb_2O_5$);
   wherein, an index of refraction of the glass material at 633 nm is between 1.6070 and 1.7660;
   wherein, a density of the glass material is between 2.70 g/cm$^3$ and 3.29 g/cm$^3$; and
   wherein, a liquidus temperature of the glass material is less than 1200° C.

7. The glass material of claim 6, wherein, the glass material comprises 37 to 41 percent by weight silicon dioxide ($SiO_2$); and 0 percent by weight phosphorous pentoxide ($P_2O_5$).

8. The glass material of claim 6, wherein, a dynamic viscosity of the glass material as a liquidus is between 14.9 and 25.1 poise.

9. A head mounted wearable device comprising:
   an image forming device that generates visible light to a light guiding device, which includes a glass material through which the visible light propagates, wherein the glass material comprises on an oxide basis:
   37 to 43 percent by weight silicon dioxide ($SiO_2$);
   0 to 3.5 percent by weight phosphorous pentoxide ($P_2O_5$);
   9.25 to 10.25 percent by weight lithium oxide ($Li_2O$);
   0.75 to 1 percent by weight sodium oxide ($Na_2O$);
   8.5 to 10 percent by weight zirconium oxide ($ZrO_2$); and
   36 to 45 percent by weight niobium pentoxide ($Nb_2O_5$);
   wherein, an index of refraction of the glass material at 633 nm is between 1.6070 and 1.7660;
   wherein, a density of the glass material is between 2.70 g/cm$^3$ and 3.29 g/cm$^3$; and
   wherein, a liquidus temperature of the glass material is less than 1200° C.

10. The head mounted wearable device of claim 9, wherein, the glass material comprises 37 to 41 percent by weight silicon dioxide ($SiO_2$); and 0 percent by weight phosphorous pentoxide ($P_2O_5$).

* * * * *

UNITED STATES PATENT AND TRADEMARK OFFICE
CERTIFICATE OF CORRECTION

| | | |
|---|---|---|
| PATENT NO. | : 11,667,561 B2 | Page 1 of 1 |
| APPLICATION NO. | : 16/678005 | |
| DATED | : June 6, 2023 | |
| INVENTOR(S) | : Qiang Fu et al. | |

It is certified that error appears in the above-identified patent and that said Letters Patent is hereby corrected as shown below:

On the Title Page

On the page 2, in Column 2, Item (56) under "Other Publications", Line 2, delete "Refrative" and insert -- Refractive --.

Signed and Sealed this
Ninth Day of January, 2024

Katherine Kelly Vidal
*Director of the United States Patent and Trademark Office*